Patented Dec. 15, 1925.

1,565,258

UNITED STATES PATENT OFFICE.

GEORGE COBB, OF BALTIMORE, MARYLAND, ASSIGNOR OF ONE-THIRD TO BERNARD L. CROZIER AND ONE-THIRD TO FRANK K. DUNCAN, BOTH OF BALTIMORE, MARYLAND.

BITUMINOUS COMPOSITION FOR PAVING.

No Drawing. Application filed October 7, 1924. Serial No. 742,231.

*To all whom it may concern:*

Be it known that I, GEORGE COBB, a citizen of the United States, residing at Baltimore, in the State of Maryland, have invented certain new and useful Improvements in Bituminous Composition for Paving; and I do hereby declare the following to be a full, clear, and exact description of the invention, such as will enable others skilled in the art to which it appertains to make and use the same.

The present invention relates to bituminous mixtures for use in making highways, the mixture being of such character that the amount of bitumen necessary to effect proper bonding of the aggregate is considerably less than that heretofore employed in approved bituminous mixtures. The small quantity of bitumen employed in the improved mixture also obviates the tendency of the pavement to shove or be displaced under traffic.

The present invention also contemplates the use of a crushed stone aggregate which shall be devoid of sand or what is termed filler. In many localities sand is difficult to procure and must be shipped from remote points of supply. It, therefore, not infrequently happens that the laying of the bituminous streets is held up because no sand is at hand with which to prepare the same, such delay being due to congestion or other causes by the transporting carrier. By eliminating sand from the mixture, I therefore make possible a more expeditious laying of a pavement and a more economical pavement. By far the greater number of our approved bituminous mixtures, which require the use of a mixing plant, are laid in at least two courses, the customary method of procedure being to employ the same plant to mix the two courses. When a single mixing plant is employed for making up both mixtures a considerable section of base mixture is laid after which the workmen must go back over the same ground to the point of starting to lay the top course. The present invention also contemplates the use of a bitumen " seal coat " or " squeegee coat " which does not require to be preliminarily mixed, thereby saving the expense of plant operation and the time of the workmen, inasmuch as the seal coat is applied while the workmen are in close proximity to the base which has already been laid.

The specifications for the improved pavement are substantially as follows:

| | By weight. |
|---|---|
| Bitumen | 3.5 to 5.0% |
| Mineral aggregate passing 200 mesh sieve | 0.0 to 5.0% |
| Mineral aggregate passing 10 mesh sieve | 5.0 to 15.0% |
| Mineral aggregate passing ¼ inch screen | 15.0 to 25.0% |
| Mineral aggregate passing ½ inch screen | 20.0 to 35.0% |
| Mineral aggregate passing ¾ inch screen | 20.0 to 40.0% |

*Mineral aggregate.*

The mineral aggregate shall consist of crushed trap rock, hard limestone, or other stone of equal quality, free from weathered or dirty particles, all of which will pass a one-inch screen and have the following grading:

| | Per cent. |
|---|---|
| Passing ¾ in. screen and retained on ½ in. screen | 20 to 40 |
| Passing ½ in. screen and retained on ¼ in. screen | 20 to 35 |
| Passing ¼ in. screen and retained on 10 mesh sieve | 15 to 25 |
| Passing 10 mesh sieve and retained on 200 mesh sieve | 5 to 15 |
| Passing 200 mesh sieve | not over 5 |

The preferred bitumen is asphalt cement having the following characteristics:

(*a*) *Penetration.*—The penetration at 77 degrees F. (25 degrees C.) shall be between 85 and 100.

(*b*) *Solubility.*—Ninety-eight and one-half per cent of the total bitumin (soluble in carbon disulphide) shall be soluble in carbon tetrachloride.

(*c*) *Ductility.*—The asphalt cement, at the penetration used, shall have a ductility of not less than 50 centimeters, at 77 degrees F. (25 degrees C.).

(*d*) *Melting point.*—The melting point, ball and ring method, shall be not less than 105 degrees F. (40.6 degrees C.).

(e) *Specific gravity.*—The specific gravity shall be not less than 1.00.

(f) *Volatility.*—The loss by volatilization, 50 grams, 5 hours, 325 degrees F. (163 degrees C.) shall not exceed 2 per cent by weight. The penetration at 77 degrees F. (25 degrees C.) of the residue after such heating must be not less than 60 per cent of the original penetration before heating.

However, it is within the scope of the invention to employ a bitumen consisting of either coal tar or water gas tar. When this type of bitumen is used the tar should be of the following specifications:

(A). *Coal tar.*—If made from a coal tar, it shall meet the following requirements:

1. *Specific Gravity.*—The specific gravity shall be not less than one and twenty-two one hundredths (1.22) nor more than one and twenty-eight one-hundredths (1.28) at sixty (60) degrees F.

2. *Melting point.*—The material shall have a melting point, determined by the one-half (½) inch cube method in water, of not less than one hundred (100) degrees F. nor more than one hundred and ten (110) degrees F.

3. *Free carbon.*—The free carbon shall be not less than twelve (12) per cent nor more than twenty-five (25) per cent.

4. *Distillation.*—A one hundred (100) cubic centimeter sample (Engler distillation) shall show the following fractions by weight. 0°–170° C., 0.0 per cent; 170°–300° C., not to exceed 15.0 per cent.

The specific gravity of the entire distillate shall be not less than one and three one-hundredths (1.03) at sixty (60) degrees F. The residue from the distillation shall have a melting point not greater than one hundred and sixty-five (165) degrees F.

(B). *Water gas tar.*—If made from a water gas tar, it shall meet the following requirements:

1. *Specific gravity.*—The specific gravity shall be not less than one and sixteen one-hundredths (1.16) nor more than one and nineteen one-hundredths (1.19) at sixty (60) degrees F.

2. *Consistency.*—When subjected to the "New York Testing Laboratory Float Test" at one hundred (100) degrees C. the float shall sink in not less than eighteen (18) nor more than twenty-six (26) seconds.

3. *Free carbon.*—The free carbon shall be not more than five (5) per cent.

4. *Distillation.*—A one hundred (100) cubic centimeter sample (Engler distillation) shall show the following fractions by weight. 0°–170° C., not more than 0.5%; 0°–235° C., not more than 3.0%; 0°–270° C., not more than 12.0%; 0°–300° C., not more than 25.0%.

The residue from the distillation shall have a melting point not greater than one hundred and sixty-five (165) degrees F.

The seal coat shall consist of asphalt cement or of the coal or water gas tars of the character above specified and shall be applied hot at the rate of approximately one quarter gallon per square yard and it shall be spread with squeegee or brooms. This shall be covered with the clean stone screenings. The surface shall then be thoroughly rolled until the chips are bonded with the seal coat the roadbed becomes a solid mass, showing an even, hard, dense, and granular surface. The stone screenings shall not be over one-half inch in size, with the dust taken out.

The materials forming the base aggregate shall be heated separately in a suitable plant to a temperature of from 225 degrees F. to 300 degrees F. and shall be combined and thoroughly mixed while hot by machinery, such mixing being continued until the mass is a homogeneous and uniform bituminous macadam and each particle of the mineral aggregate is thoroughly coated with the bituminous compound.

This mixture, prepared in the manner above described, shall be brought to the street at a temperature between 225 degrees F. and 300 degrees F. and shall be covered with canvas covers while in transit. On reaching the street it shall at once be dumped on a spot outside of the space on which it is to be spread. It shall then be deposited roughly in place by means of hot shovels, after which it shall be uniformly spread by means of hot iron rakes in such a manner that after having received its final compression by rolling, the finished surface shall conform to the true crown and grade and shall have a thickness of not less than that specified; that is, one and one-half inches or two inches. After raking, the mixture shall at once be compressed by rolling with a tandem roller weighing not less than ten tons or a three-wheel power roller, weighing not less than twelve tons.

Attention is particularly called to the fact that no sand is employed in my improved mixture, the entire mineral aggregate being obtained from the quarry direct. The cost of producing the mineral aggregate is therefore reduced to a minimum.

The grading of this mineral aggregate is such that voids are reduced to a minimum, hence the relatively small amount of bitumen is sufficient to properly bond the aggregate.

What I claim is:

1. In a pavement, a mixture consisting of 3½% to 5% of bitumen, and a crushed rock mineral aggregate passing a #200 mesh sieve not over 5%, passing a #10 sieve 5% to 15%, passing a ¼ inch screen 15% to 25%, passing a ½ inch screen 20% to 35%, and passing a ¾ inch screen 20% to 40%.

2. A paving mixture adapted for use without sand or filler and with 3½% to 5% of bitumen; a mineral aggregate consisting of crushed rock passing ¾ inch screen and retained on ½ inch screen, 20% to 40%; passing ½ inch screen and retained on ¼ inch screen, 20% to 35%; passing ¼ inch screen and retained on 10 mesh sieve, 15% to 25%; passing 10 mesh sieve and retained on 200 mesh sieve, 5% to 15%.

In testimony whereof I affix my signature.

GEORGE COBB.